W. S. ELLIOTT.
MULTIPLE STRAINER.
APPLICATION FILED NOV. 10, 1914.

1,189,077.

Patented June 27, 1916.
3 SHEETS—SHEET 2.

WITNESSES
R. A. Balderson
H. M. Convin

INVENTOR
Wm. S. Elliott
by Bakewell, Byrnes & Parmelee
Attys.

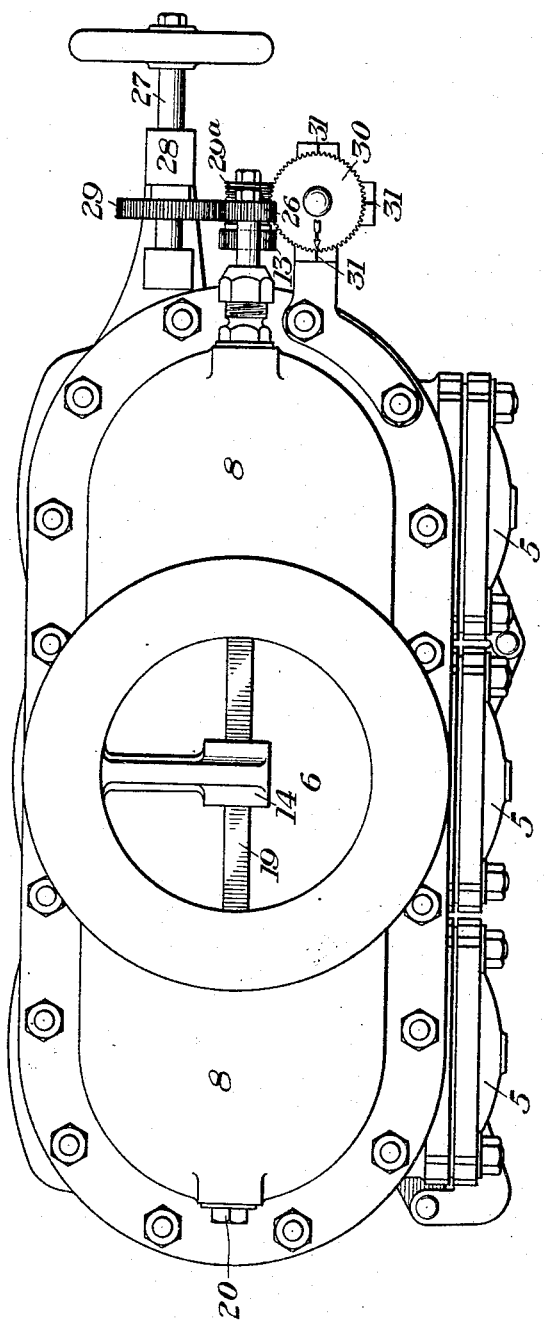

UNITED STATES PATENT OFFICE.

WILLIAM S. ELLIOTT, OF PITTSBURGH, PENNSYLVANIA.

MULTIPLE STRAINER.

1,189,077.  Specification of Letters Patent.  Patented June 27, 1916.

Application filed November 10, 1914. Serial No. 871,250.

*To all whom it may concern:*

Be it known that I, WILLIAM S. ELLIOTT, a citizen of the United States, residing at Pittsburgh, in the county of Allegheny and State of Pennsylvania, have invented a new and useful Improvement in Multiple Strainers, of which the following is a full, clear, and exact description, reference being had to the accompanying drawings, forming part of this specification, in which—

Figure 1:
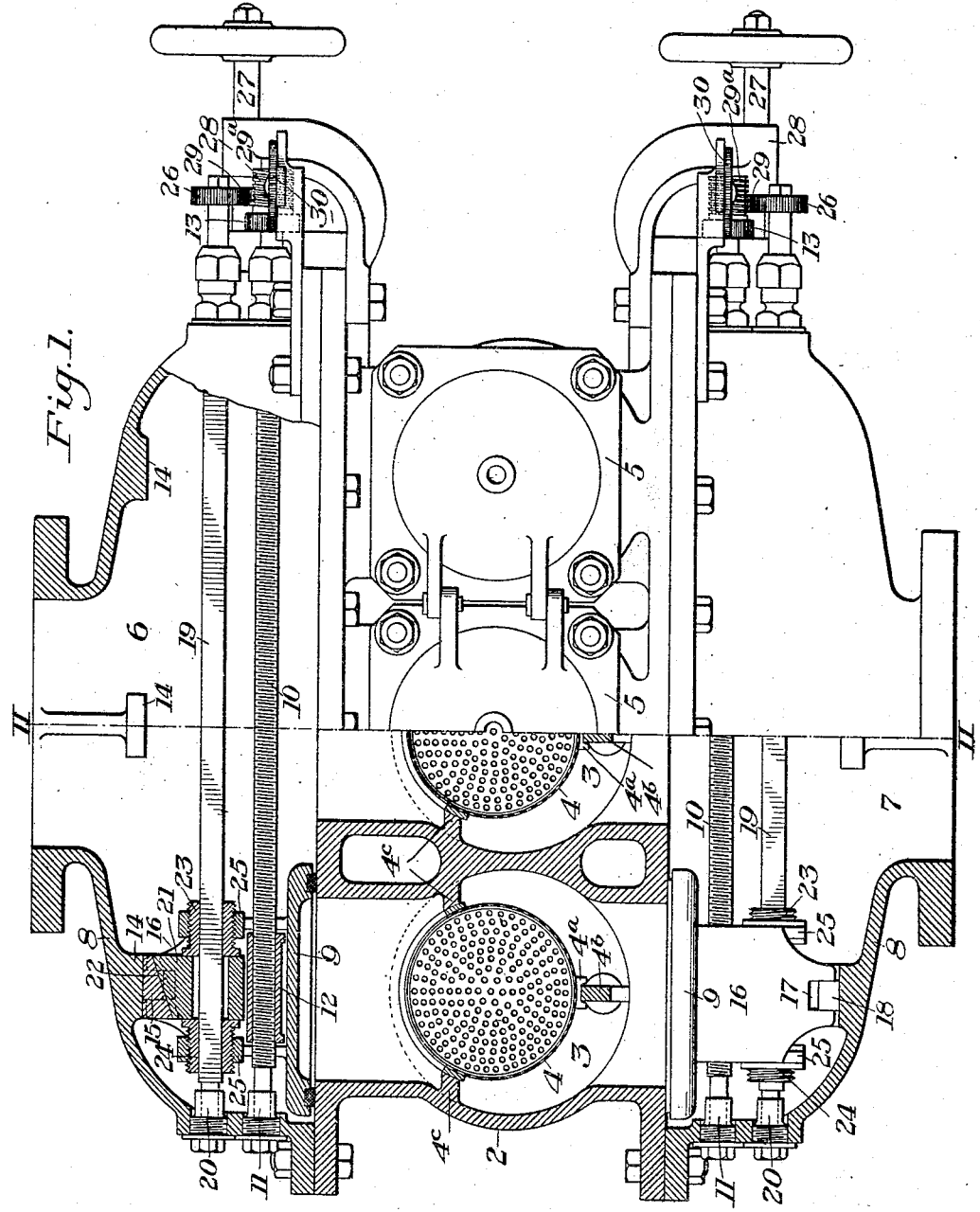
Figure 2:
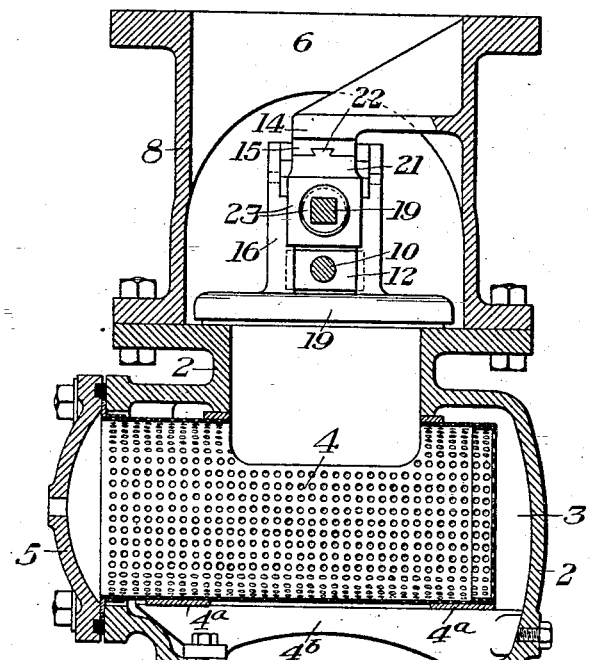
Figure 4:
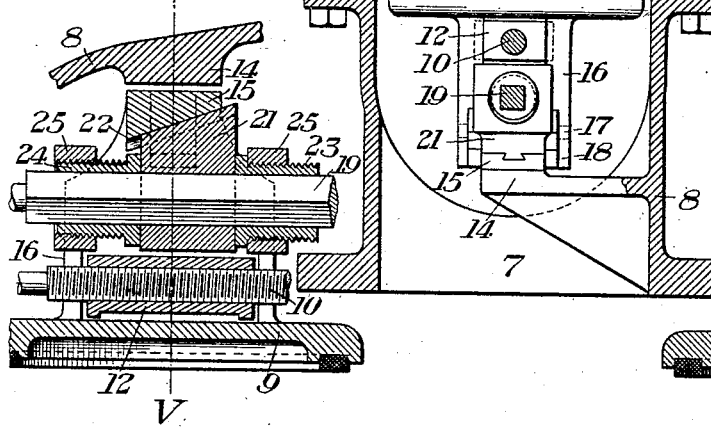
Figure 5:
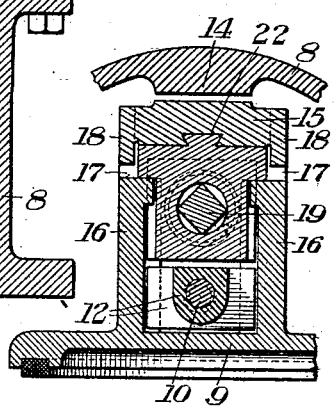

Figure 1 is a view partly in front elevation and partly in vertical section of a multiple strainer embodying my invention; Fig. 2 is a section on the line II—II of Fig. 1; Fig. 3 is a plan view; Fig. 4 is a detail view of a portion of the locking means; and Fig. 5 is a sectional view on the line V—V of Fig. 4.

My invention has relation to multiple strainers or filters, in which there are a plurality of strainer or filter chambers arranged in parallel within a suitable casing, the casing having common inlet and outlet connections, arranged to communicate with all the chambers. Strainers or filters of this type are usually provided with valve means, whereby any chamber can be closed off from the inlet and outlet connections to enable its strainer or filter elements to be removed or repaired or the chamber to be thoroughly cleaned.

My invention is more especially designed to provide an improved arrangement of the valve mechanism for closing off the chambers and to means in connection therewith whereby the valves can be held securely seated in the closed positions to prevent any leakage into the chamber which is closed off. Also to provide novel means for supporting the strainer elements.

The nature of my invention will be best understood by reference to the accompanying drawings, in which I have shown the preferred embodiment thereof and which will now be described, it being premised, however, that various changes can be made in the construction and arrangement of the various parts without departing from the spirit and scope of the invention as defined in the appended claims.

In these drawings, the numeral 2 designates the body portion of the casing, having therein three parallel strainer chambers 3, in each of which is supported a strainer element 4, adapted to be removed at one end of the chamber by taking off a cap or closure 5. At one side or end of the casing is an inlet chamber 6; and at the opposite side an outlet chamber 7, the portions of the casing containing these chambers being preferably formed by separate casting members 8, which are secured to the ends of the body 2. I preferably provide each of the strainer elements, or baskets, on its lower side with a projecting guide $4^a$ which, when the basket is on the chamber, seats upon the longitudinally extending supporting bar $4^b$ in the lower portion of the chamber. The walls of each chamber may also be provided with the centering projections $4^c$. The construction and arrangement of the strainer casing, the strainer chambers and the strainer elements may be widely varied, however, without departing from my invention.

In accordance with my invention, I place in each of the chambers 6 and 7 a slide valve 9, which is arranged to have a traverse across the chamber and to close the inlet or outlet of each of the strainer chambers in the different positions. Each of these valves is actuated by a screw shaft 10, which is held in suitable bearings 11 in the casing sections 8, this shaft engaging a nut 12, carried by the valve. Each of the shafts 10, is extended through the casing at one end and carries a pinion 13. The casing sections 8 have an internal projection 14 in line with each of the strainer chambers, these projections being designed to form abutments for wedging members 15. Each of the valves 9 carries bracket arms 16, formed with recesses 17 in which projections 18 of the wedge members 15 are loosely seated, so as to be capable of movement toward and away from the abutments 14. Placed adjacent to each of the screw shafts 10 is a squared shaft 19, which is journaled in suitable bearings 20, in the casing section 8 and which extends loosely through a wedge block 21, adapted to coöperate with the adjacent web 15.

The coacting inclined surfaces of the wedge block or web are preferably formed with a dovetailed engagement, as shown at 22. At each side of the web block 11, each shaft 19 engages two nuts 23 and 24, which have external threads arranged to engage and travel in fixed bearings 25, carried by the valve 9. One end of the shaft 19 is extended through the casing adjacent to the extension of the shaft 10 and carries the pinion 26. Each of the casing sections 8 is provided with an actuating shaft 27, mounted in suitable bearings 28 for both endwise and rotary movement, and secured to each of these actuating shafts is a pinion 29, which, in one position, is adapted to engage the pinion 13 on the shaft 10, and in another position is adapted to engage the pinion 26 on the shaft 19. The extended end of each of the screw shafts 10 also carries a worm 29ª, meshing with a worm wheel 30, which coöperates with certain marks 31, on the casing, to form an indicator to denote the position of the valve. That is to say, when the valve 9 is in the position shown in Fig. 1, the indicator will be in the position shown in Fig. 3, and as the valve is moved to the right, the indicator is given a movement to indicate the position of the valve over one or the other of the strainer chambers. These indicators enable the operator to determine exactly the positions of the valves, in order to completely close off any chamber.

In the position of the parts as shown in Figs. 1 and 2, the wedge blocks 21 force the wedge members 15 outwardly against the adjacent abutments 14, and the valves 9 are thereby forced tightly against their seats. When it is desired to shift the valves, the actuating shafts 27 (being in the positions shown—see particularly Fig. 3) are actuated, thereby rotating the shafts 19 and moving the nuts 23 and 24 to the right. The movements of the nuts 24 forces the wedge blocks 21 to the right, thereby loosening the wedges 15 and permitting them to drop away from the abutments 14 (see Fig. 4). The actuating shafts are then moved in to cause their pinions to engage the pinions 13 on the shaft 10, after which actuation of the shafts 27 will effect the movement of the valves 9. When the indicators show that the valves have been moved to the correct position, the actuating shafts are again moved endwise to reëngage their pinions with the pinions 26 on the shafts 19, and the latter are turned in the reverse direction to cause the wedge blocks 21 to force the wedges 10 into holding engagement with the adjacent abutments 15.

It will be noted that the block and wedge for each valve are carried by that valve and travel with it, the same wedge block coöperating in turn with each of the abutments 14, at that end of the strainer.

The advantages of my invention will be apparent, since it provides a simple arrangement of valves and valve-actuating and locking means whereby the same set of valves may be used to entirely close off any one of the strainer chambers, while permitting unobstructed use of the remaining chambers.

I claim:

1. A multiple strainer or filter having more than two strainer or filter chambers, a single valve adapted to control each of said chambers, actuating means for shifting said valve from one position to another, and means for locking the valve in each of its seated positions, substantially as described.

2. A strainer or filter having more than two strainer or filter chambers, a single valve adapted to be shifted from one position to another to control the different chambers, actuating means for shifting said valve, and locking means carried by the valve and coöperating with the casing to secure the valve in each of its seated positions, substantially as described.

3. A strainer or filter having more than two strainer or filter chambers communicating with a common chamber, a single valve in said common chamber and arranged to be shifted from one position to another to control the communication with the strainer or filter chamber, a locking device for the valve in each of its positions, actuating means for said valve, and actuating connections extending from the locking device to the exterior of the strainer, substantially as described.

4. A multiple strainer or filter having a shiftable valve, a shaft for moving said valve, locking means carried by the valve, and an actuating shaft arranged to be operatively engaged either with the first named shaft or with the locking means, substantially as described.

5. A multiple strainer or filter having a plurality of strainer or filter chambers, a shiftable valve, a screw shaft engaging said valve, locking devices carried by the valve and adapted to be moved into and out of locking engagement with the strainer casing, said locking means having a shaft, and an actuating shaft having means whereby it can be engaged with and disengaged from both the valve shaft and the locking means shaft, substantially as described.

6. A strainer or filter having more than two filter or strainer chambers, a shiftable valve for controlling communication with the different chambers, means for actuating said valve to move it from one controlling position to another, means for locking the valve in each of its controlling positions, means whereby said locking device may be operated independently of the mechanism which actuates the valve, and indicating means for indicating the different positions of the valve, substantially as described.

7. A strainer or filter having more than two filter or strainer chambers, a shiftable valve for controlling communication with the different chambers, means for actuating said valve to move it from one controlling position to another, and indicating means for indicating the different positions of the valve, together with locking means for holding the valve tightly to its seat in each of its seated positions, substantially as described.

8. A strainer or filter having more than two filter or strainer chambers, a shiftable control valve, actuating means for said valve, a locking member carried by the valve, and actuating means for the locking member, the casing having a plurality of abutments for coöperating with said locking member in the different positions of the valve, substantially as described.

9. A strainer or filter having end filter or strainer chambers and an intermediate strainer or filter chamber, a shiftable valve adapted to be moved into position to control any one of said chambers, a locking device carried by said valve and arranged to lock the valve in each of its shifted positions, actuating connections for the valve, and means whereby the locking device may be set and released independently of the movement of the valve, substantially as described.

In testimony whereof, I have hereunto set my hand.

W. S. ELLIOTT.

Witnesses:
H. M. CORWIN,
GEO. H. PARMELEE.

Copies of this patent may be obtained for five cents each, by addressing the "Commissioner of Patents, Washington, D. C."